(12) United States Patent
Huang

(10) Patent No.: US 8,590,165 B2
(45) Date of Patent: Nov. 26, 2013

(54) EXTENDED REACH GARDEN SHEARS

(75) Inventor: Yao-Chung Huang, Fu Shing Hsiang (TW)

(73) Assignee: Ho Cheng Garden Tools Co., Ltd., Fu Shing Hsiang, Chang Hua Hsien (TW)

( * ) Notice: Subject to any disclaimer, the term of this patent is extended or adjusted under 35 U.S.C. 154(b) by 340 days.

(21) Appl. No.: 12/957,367

(22) Filed: Nov. 30, 2010

(65) Prior Publication Data

US 2012/0131802 A1 May 31, 2012

(51) Int. Cl.
*B26B 13/00* (2006.01)

(52) U.S. Cl.
USPC .................... 30/249; 30/246; 30/261; 30/251

(58) Field of Classification Search
USPC ........ 30/296.1, 269, 261, 263, 212, 271, 185, 30/192, 190, 254, 251, 249, 250, 245, 244
See application file for complete search history.

(56) References Cited

U.S. PATENT DOCUMENTS

| | | | | |
|---|---|---|---|---|
| 1,173,527 A | * | 2/1916 | McKenney | 30/185 |
| 2,093,932 A | * | 9/1937 | Schwalb, Jr. | 30/185 |
| 2,457,417 A | * | 12/1948 | Trautmann | 30/92 |
| 5,184,404 A | * | 2/1993 | Chen | 30/250 |
| 5,734,018 A | * | 3/1998 | Rutter et al. | 530/344 |
| 5,743,018 A | * | 4/1998 | Wang | 30/249 |
| 5,745,998 A | * | 5/1998 | Le et al. | 30/249 |
| 5,970,617 A | * | 10/1999 | Chang | 30/249 |
| 7,937,839 B2 | * | 5/2011 | Fidgen et al. | 30/135 |
| 8,225,513 B2 | * | 7/2012 | Huang | 30/254 |
| 8,327,549 B2 | * | 12/2012 | Huang | 30/251 |
| 2002/0162227 A1 | * | 11/2002 | Cech | 30/249 |
| 2003/0106223 A1 | * | 6/2003 | Lee | 30/249 |
| 2003/0177644 A1 | * | 9/2003 | Cheng | 30/249 |
| 2004/0045175 A1 | * | 3/2004 | Jang | 30/249 |
| 2009/0025828 A1 | * | 1/2009 | Chen | 144/24.13 |
| 2009/0151169 A1 | * | 6/2009 | Huang | 30/185 |
| 2010/0236081 A1 | * | 9/2010 | Guo | 30/249 |

* cited by examiner

*Primary Examiner* — Stephen Choi
*Assistant Examiner* — Fernando Ayala

(57) ABSTRACT

An extended reach garden shears includes a shear rod, a driven arm, an operating arm and a connecting piece. The shear rod has a fixed cutter base on one end. The fixed cutter base is formed with a hooked cutting edge. The fixed cutter blade is provided with a primary shaft hole and a secondary shaft hole. A driven arm is provided with a rotation hole and is pivotally connected to the primary shaft hole of the fixed cutter base. The driven arm is formed with a cutting blade to match the hooked cutting edge. The bottom end of the cutting blade extends to form a connecting portion. The distal end of the connecting portion is bent to form a driven rack. The operating arm is provided with a pivotal hole. The pivotal hole is pivotally connected to the secondary shaft hole of the fixed cutter base. The operating arm is formed with an operating rack adjacent to the pivotal hole. The operating rack is drivingly engaged with the driven rack. The driven arm and the operating arm are sandwiched between the connecting piece and the fixed cutter base.

7 Claims, 7 Drawing Sheets

EXTENDED REACH GARDEN SHEARS

BACKGROUND OF THE INVENTION

1. Field of the Invention

The present invention relates to extended reach garden shears, and in particular to extended reach garden shears driven by a toothed engagement that is easier to operate.

2. Description of the Prior Art

FIG. 7 shows conventional extended reach garden shears, which comprise a shear body 50 and a cutter 60. An upper end of the shear body 50 is provided with a cutter base 51. The center of the cutter base 51 is provided with a pivotal hole 52. One side of the cutter base 51 is formed with a curved jaw portion 53. The upper end of the cutter base 51 is provided with a though-hole where an elastic element 54 is connected. The shear body 50 is provided with a pulley 55 on the side opposite the jaw portion 53. One side of the cutter 60 is formed into a cutting blade 61 and a pivotal hole 62 located near the cutting blade 61 to pivotally connect to the cutter base 51 via the pivotal hole 52. The other side of the cutter 60 extends to form an operating arm 63. One side of the operating arm 63 is connected to rope 631. The rope 631 passes through the pulley 55 so that a user may pull the rope 631 to operate the extended reach garden shears. The other side of the operating arm 63 is connected to the elastic element 54 of the cutter base 51. With this structure, the cutter 60 can be continuously operated by means of the cooperation between the elastic element 54 and the rope 631.

However, in practice, the above-mentioned conventional extended reach garden shears has the following disadvantages.

1 The user pulls the rope 631 to drive the operating arm 63 to swing, thereby driving the cutter blade 61 to generate a shearing action. Although the operating arm 63 increases the shearing force of the cutter 60 according to the Lever Principle, the user has to pull the rope 631 during the shearing, which is not easy to do and the user is likely to get tired after periods of use. Thus, conventional extended reach garden shears are impractical.

2 The cutter 60 is pivotally connected to the pivotal hole 52 of the cutter base 51, which means the cutter 60 is fixed at a single point. When the extended reach garden shears are used for a period of time, a gap may form quite easily between the cutter 60 and the cutter base 51. As a result, the jaw portion 53 cannot tightly abut against the cutter blade 61, which affects the shearing action of the extended reach garden shears. Thus, the durability of the conventional extended reach garden shears is lessened.

In view of the above, the present inventor proposes a novel and practicable structure based on his expert experience and considered research in this field.

SUMMARY OF THE INVENTION

In order to solve the above problems, an objective of the present invention is to provide extended reach garden shears driven by a toothed engagement.

In order to achieve the above objective, the present invention provides an extended reach garden shears driven by a toothed engagement, wherein a driven arm is pivotally connected to a primary shaft hole of a fixed cutter base, an operating arm is pivotally connected to a secondary shaft hole of the fixed cutter base, and the driven arm is driven by the operating arm. Since the driven arm and the operating arm rotate using different shaft holes as center of rotation, the total length of the driven arm and the operating arm can generate an increased output torque, thereby saving labor.

According to another feature of the present invention, a driven rack provided on the driven arm is engaged with an operating rack provided on the operating arm, so that the driven arm can be stably driven by the operating arm, thereby increasing the smoothness of the shearing action.

According to another feature of the present invention, the driven arm and the operating arm are pivotally connected to the fixed cutter base. The driven arm and the operating arm are sandwiched between a connecting piece and the fixed cutter base, thereby restricting the driven arm and the operating arm to only pivotally sliding movements. The relative distance between the fixed rotation hole and the pivotal hole is fixed, thereby preventing change in the relative positions between the driven arm and the operating arm as well as the engagement between the driven rack and the operating rack. Thus, the durability of the present invention is increased.

The above objectives, advantages and novel features of the present invention will be described in more detail with reference to a preferred embodiment thereof shown in the accompanying drawings.

DETAILED DESCRIPTION OF THE INVENTION

In order to better understand the objectives, features and effects of the present invention, a detailed description relating thereto will be made with reference to the accompanying drawings.

Figure 1:
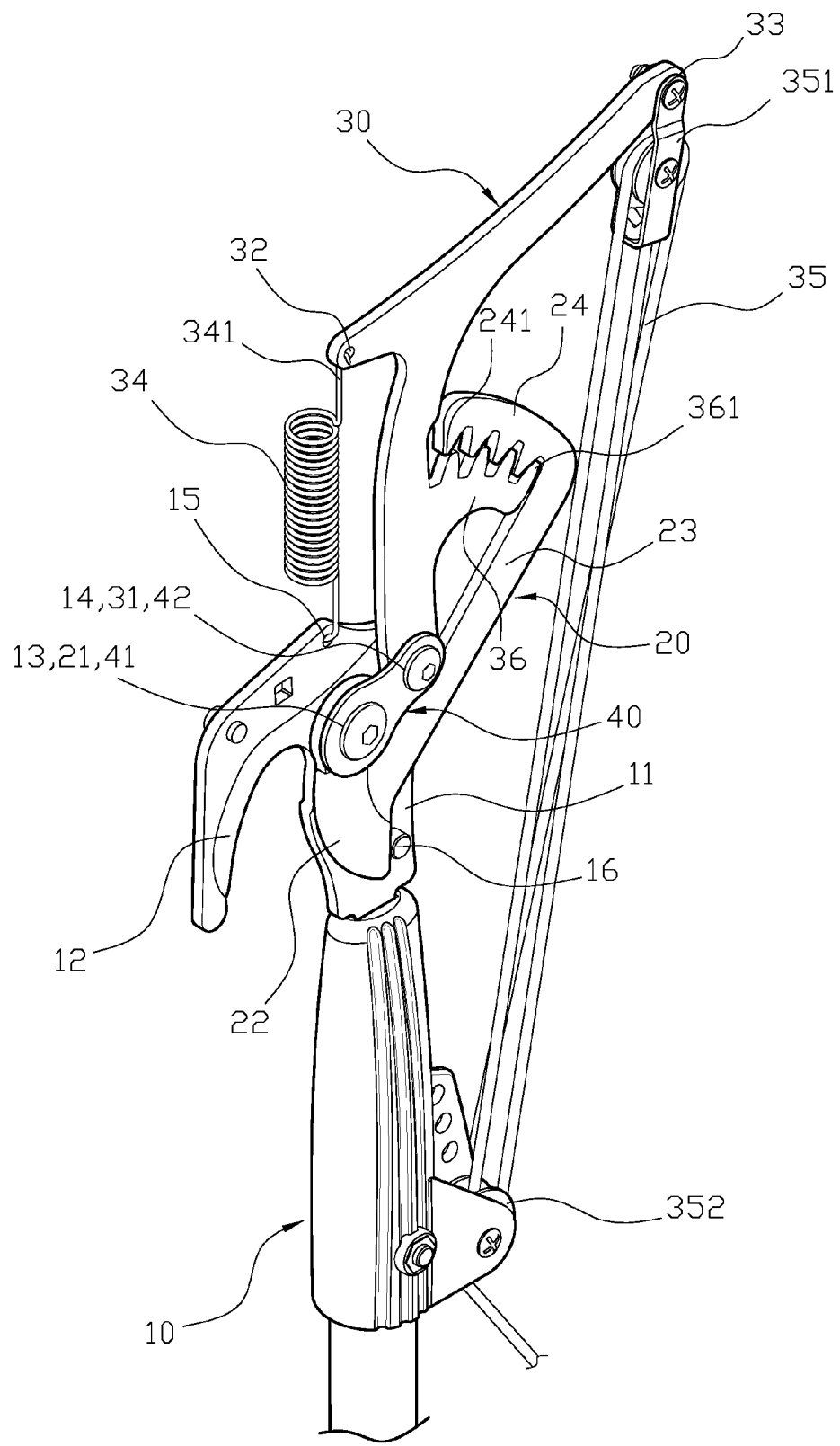
FIG. 1 is a perspective view of an embodiment of the present invention.
Figure 2:
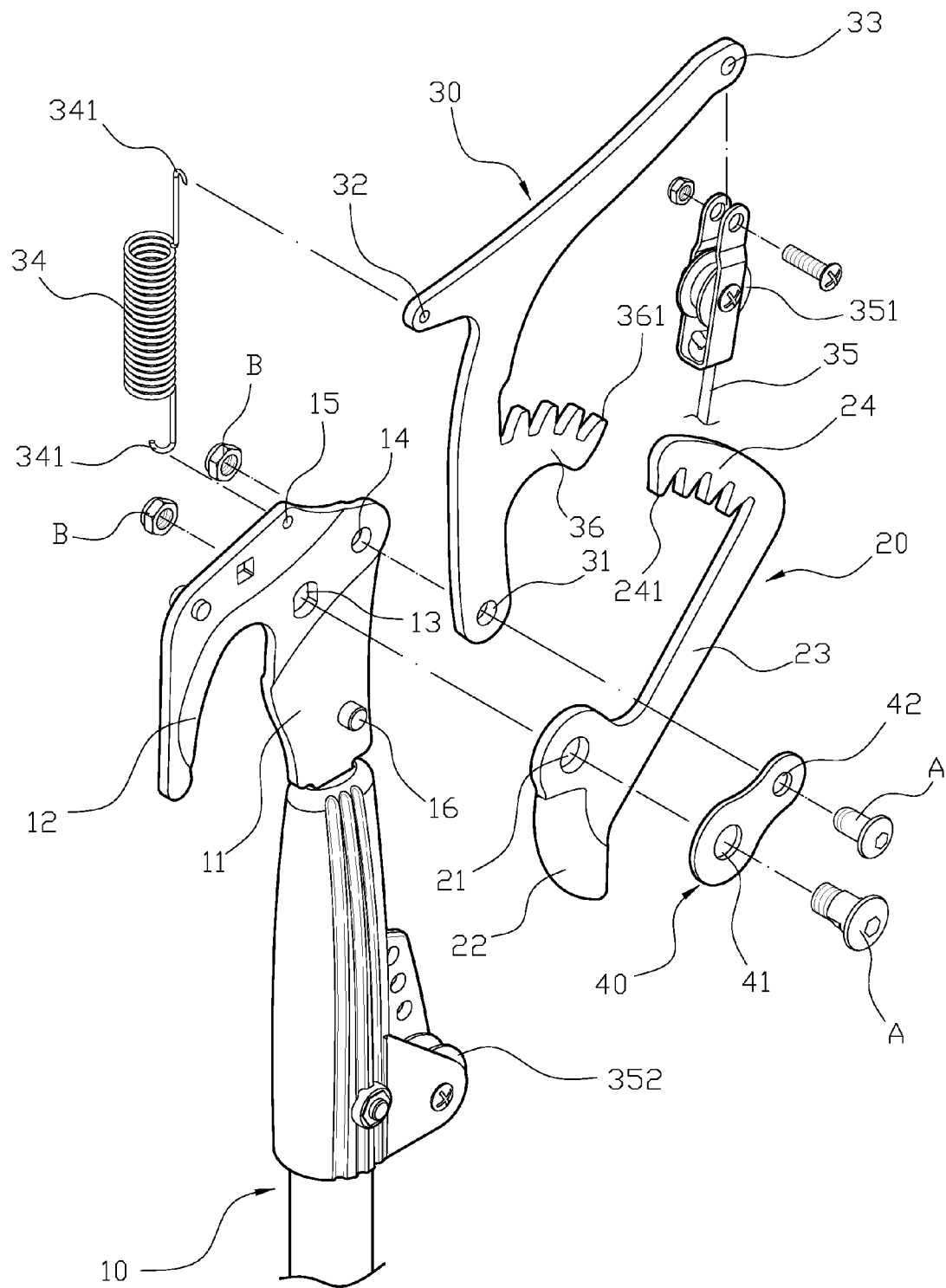
FIG. 2 is an exploded perspective view of an embodiment of the present invention.
Figure 3:
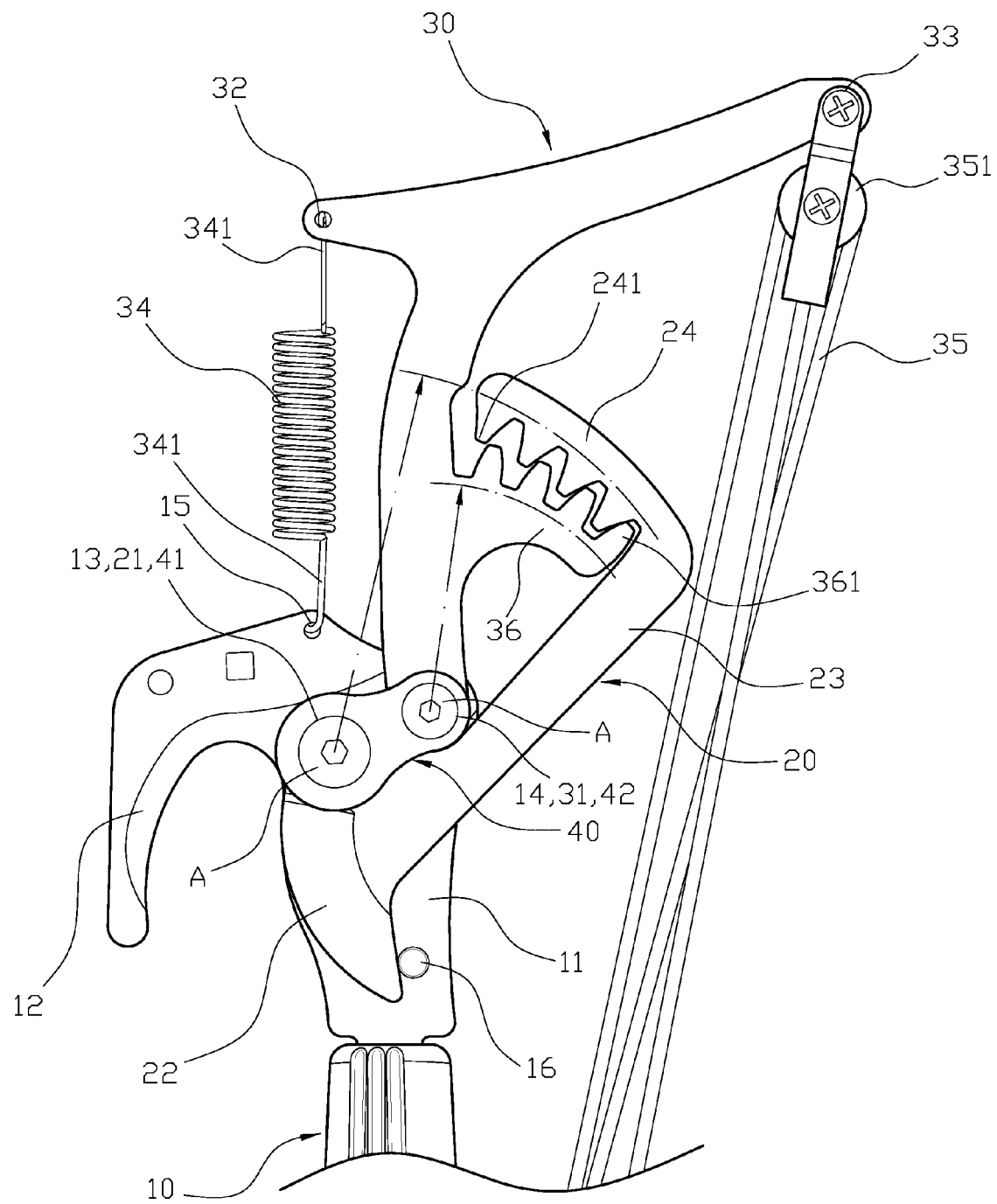
FIG. 3 is a side view of an embodiment of the present invention.

Please refer to FIGS. 1 to 3. An embodiment of the present invention provides extended reach garden shears, which include a shear rod 10, a driven arm 20, an operating arm 30 and a connecting piece 40. One end of the shear rod 10 is provided with a fixed cutter base 11 having a hooked cutting edge 12. The fixed cutter base 11 is provided with a primary shaft hole 13, a secondary shaft hole 14 and a locking hole 15. The driven arm 20 is provided with a rotation hole 21 for pivotally connecting to the primary shaft hole 13 of the fixed cutter base 11. The driven arm 20 is formed with a cutting blade 22 to match the hooked cutting edge 12. The bottom end of the cutting blade 22 extends to form a connecting portion 23. The distal end of the connecting portion 23 is bent to form a driven rack 24. The driven rack 24 is formed into a curved shape. The radius of the driven rack 24 is equal to the circular projection of the rotation hole 21. When the cutting blade 22 and the hooked cutting edge 12 approach each other to generate a shearing action, both of them are in a shearing position. When the cutting blade 22 and the hooked cutting edge 12 are separated from each other, both of them are in an un-shearing position. An operating arm 30 is provided with a pivotal hole 31, a through-hole 32 and a connecting hole 33 arranged in a triangular shape. The pivotal hole 31 is pivotally connected to the secondary shaft hole 14 of the fixed cutter base 11. An elastic element 34 is connected between the through-hole 32 and the locking hole 15 of the fixed cutter base 11. In the present invention, the elastic element 34 is a tension spring. Both ends of the elastic element 34 are formed with a hook 341. The two hooks 341 are hooked into the locking hole 15 of the fixed cutter base 11 and the through-hole 32 of the operating arm 30. The hooked cutting edge 12 and the cutting blade 22 are located in the un-shearing position when the elastic element 34 retracts. The connecting hole 33 is connected to a control rope 35. Further, the connecting hole 33 of the operating arm 30 is provided with a fixed pulley 351. The control rope 35 wraps around the fixed pulley 351. The control rope 35 further wraps around a roller 352 provided on the shear rod 10. The hooked cutting edge 12 and the cutting blade 22 are located in the shearing position when the control rope 35 is operated accordingly. The operating arm 30 is formed with an operating rack 36 adjacent to the pivotal hole 31. The operating rack 36 is formed into a curved shape. The radius of the operating rack 36 is equal to the circular projection of the pivotal hole 31. The driven rack 24 is drivingly engaged with the operating rack 36. A connecting piece 40 is provided with a primary through-hole 41 and a secondary through-hole 42. The primary through-hole 41 of the connecting piece 40, the primary shaft hole 13 and the rotation hole 21 are aligned with each other and fixed together by a fastener, such as a screw. The secondary through-hole 42 of the connecting piece 40, the secondary shaft hole 14 and the pivotal hole 31 are aligned with each other and fixed together by another screw. With this arrangement, the driven arm 20 and the operating arm 30 are sandwiched between the connecting piece 40 and the fixed cutter base 11. The fixed cutter base 11 is provided with a restricting block 16. In the un-shearing position, the restricting block 16 abuts against the back of the cutting blade 22, so that the hooked cutting edge 12 and the cutting blade 22 form a maximum included angle. In the shearing position, the restricting block 16 abuts against the connecting portion 23 of the driven arm 20, so that the hooked cutting edge 12 and the cutting blade 22 form a minimum included angle.

With the above structure, the rotation hole 21 of the driven arm 20 is aligned with the primary shaft hole 13 of the fixed cutter blade 11 of the shear rod 10. The pivotal hole 31 of the operating arm 30 is aligned with the secondary shaft hole 14 of the fixed cutter blade 11. The primary through-hole 41 and the secondary through-hole 42 of the connecting piece 40 are axially aligned with the rotation hole 21 and the pivotal hole 31 respectively. The screw A and the nut B are used to pivotally connect the driven arm 20 and the operating arm 30 to the fixed cutter base 11. The driven arm 20 and the operating arm 30 are sandwiched between the connecting piece 40 and the fixed cutter blade 11, so that the driven arm 20 and the operating arm 30 can be restricted to only pivotally sliding movements. In this way, the relative distance between the rotation hole 21 and the pivotal hole 31 can be fixed. The cutting blade 22 of the driven arm 20 is positioned to face the hooked cutting edge 12, and the driven rack 24 is drivingly engaged with the operating rack 36. Hooks 341 formed on both ends of the elastic element 34 are hooked into the locking hole 15 of the fixed cutter base 11 and the through-hole 32 of the operating arm 30 respectively. The control rope 35 wraps around the fixed pulley 351 of the operating arm 30 and the roller 352 of the shear rod 10. With the above structure, an embodiment of extended reach garden shears of the present invention is obtained.

Figure 4:
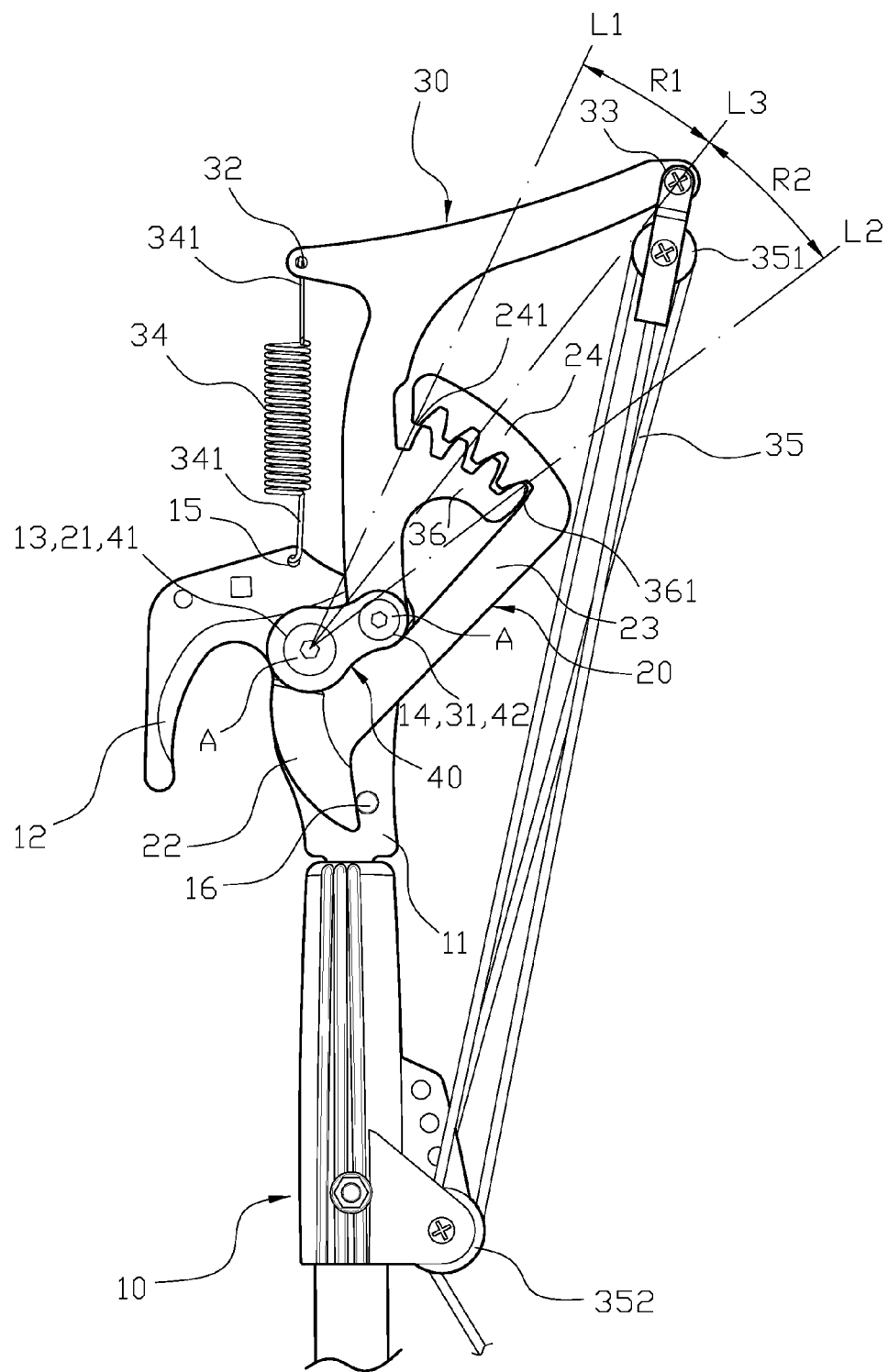
FIG. 4 is a side view showing an embodiment of the present invention in an un-shearing position.

The structure of the present invention will be further described with reference to FIGS. 4 to 6. An outer edge of the driven rack 24 has a first tooth 241. A first extension line L1 is formed between the first tooth 241 and the primary shaft hole 13. An outer edge of the operating rack 36 has a second tooth 361. A second extension line L2 is formed between the second tooth 361 and the primary shaft hole 13. Further, a third extension line L3 is formed between the primary shaft hole 13 and the connecting hole 33. A first included angle R1 is formed between the first extension line L1 and the third extension line L3. A second included angle R2 is formed between the second extension line L2 and the third extension line L3. As shown in FIG. 4, when the hooked cutting edge 12 and the cutting blade 22 are located in the un-shearing position, the first included angle R1 is equal to the second included angle R2. Each of The first included angle R1 and the second included angle R2 is in a range from 10 degrees to 20 degrees.

Figure 5:
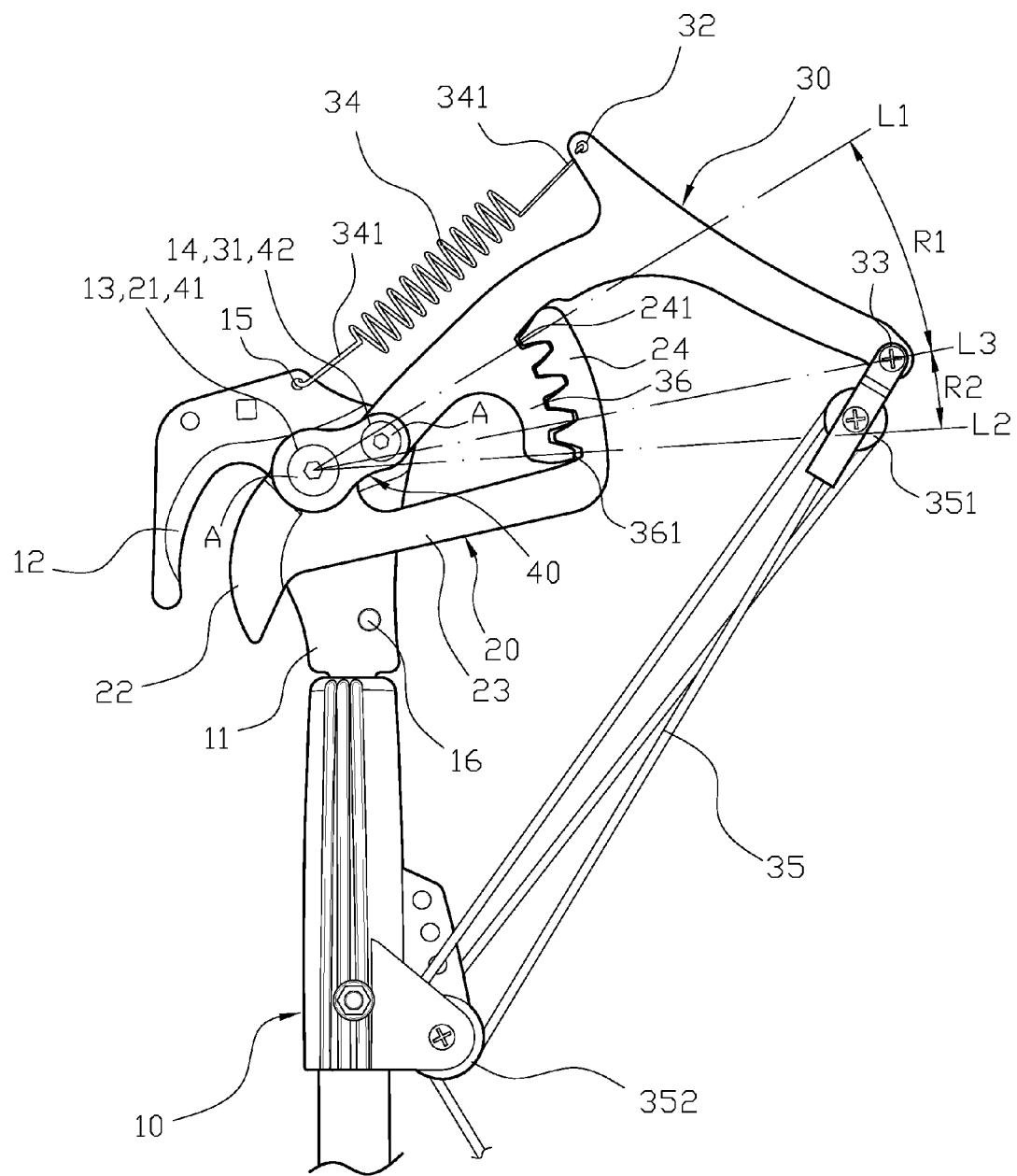
FIG. 5 is a side view showing a shearing operation according to an embodiment of the present invention.
Figure 6:
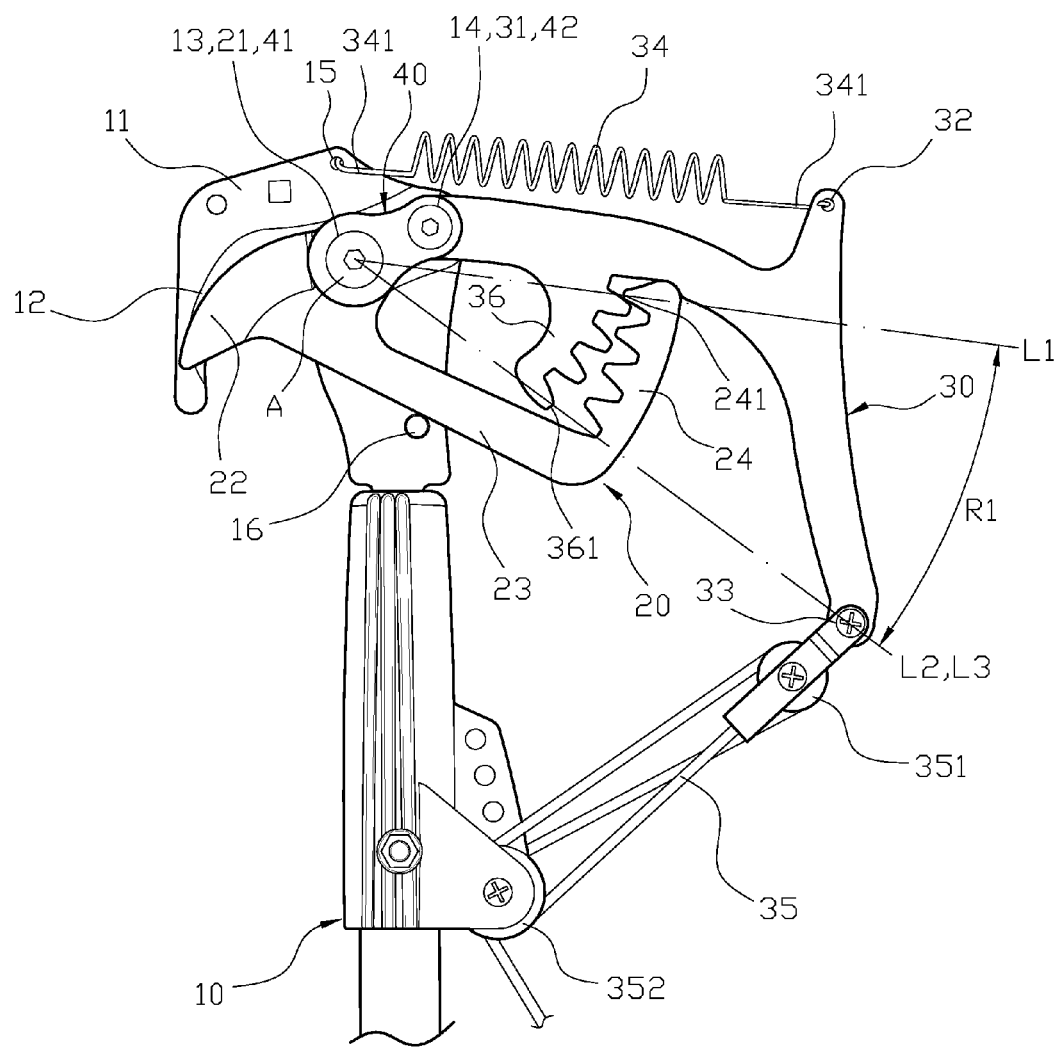
FIG. 6 is a side view showing an embodiment of the present invention in a shearing position.
Figure 7:
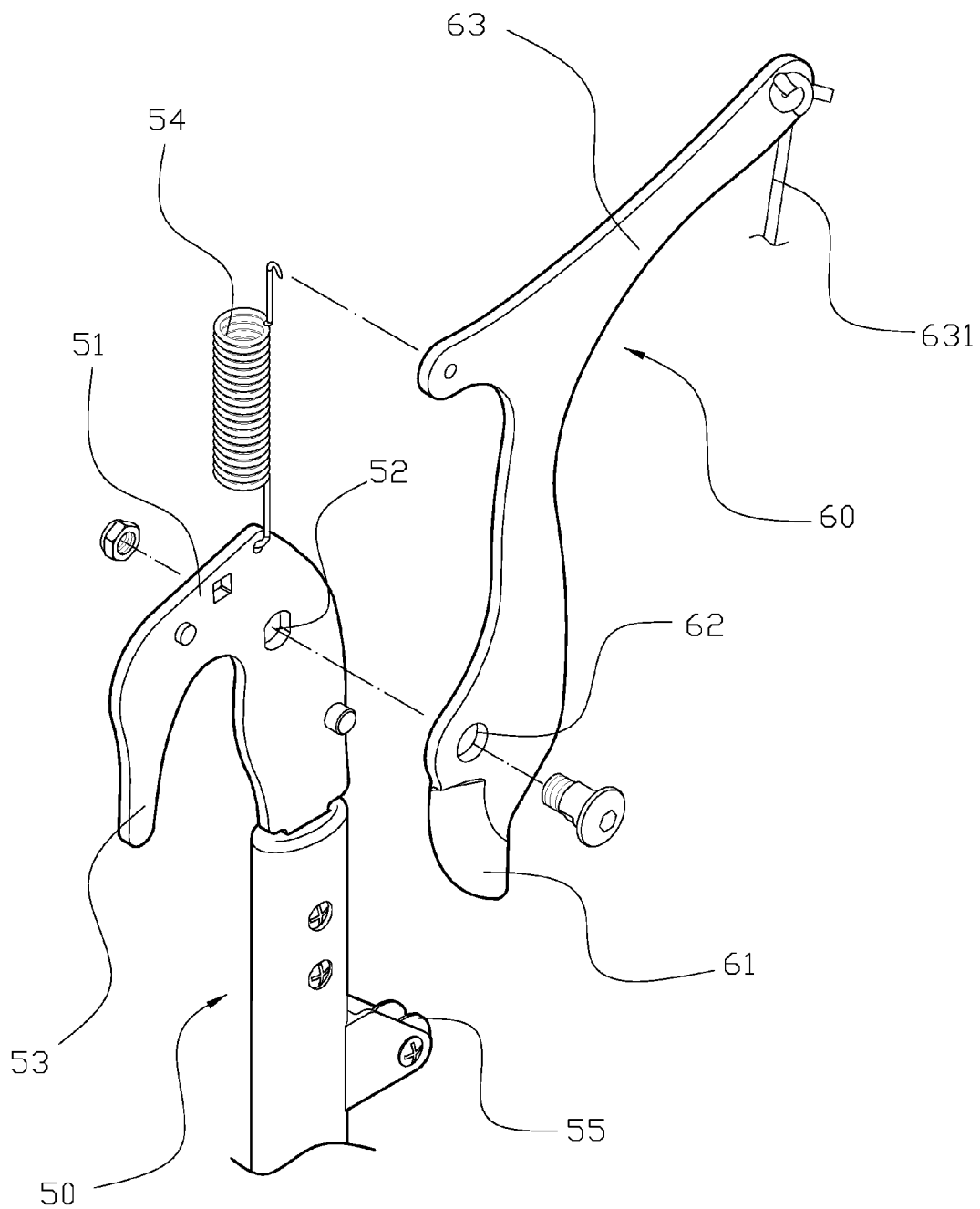
FIG. 7 is an exploded perspective view of a prior art device.

When the user pulls the control rope to perform the shearing action, as shown in FIG. 5, the connecting hole 33 of the operating arm 30 is subjected to a pulling force to move toward the control rope 35, so that the operating arm 30 pivotally rotates by using the secondary shaft hole 14 as the center of rotation, thereby pulling the end of elastic element 34 hooked into the through-hole 32. Then, the operating rack 361 of the operating arm 3 drives the driven rack 24 of the driven arm 20, so that the driven arm 20 and the operating arm 20 pivotally rotate in the same direction. At this time, the first included angle R1 gradually exceeds the second included angle R2. Further, the driven arm 20 pivotally rotates by using the primary shaft hole 13 as the center of rotation, thereby driving the cutting blade 22 of the driven arm 20 to approach the hooked cutting edge 12 to generating a shearing action. Since the driven rack 24 is stably engaged with the operating rack 36, the total length of the driven arm 20 and the operating arm 30 can generate an increased output torque, so that the pulling force necessary for operating the present invention is reduced, which means the present invention provides labor-saving benefits. When the shearing action is completed, as shown in FIG. 6, the hooked cutting edge 12 and the cutting blade 22 are in the shearing position. The first included angle R1 is larger than the second included angle R2. The first included angle R1 is in a range from 20 degrees to 40 degrees. The second included angle R2 is smaller than 10 degrees. At this time, the user releases the control rope 35, so that the operating arm 30 returns to its original position due to the elastic force of the elastic element 34. The operating rack 36 of the operating arm 30 drives the driven rack 24 of the driven arm 20, thereby causing the cutting blade 22 of the driven arm 20 to separate from the hooked cutting edge 12 of the fixed cutter base 11. As a result, the cutting blade 22 and the hooked cutting edge 12 return to the un-shearing position.

The present invention has the following advantageous features:

1. The driven arm 20 is pivotally connected to the primary shaft hole 13 of the fixed cutter base 11. The operating arm 30 is pivotally connected to the secondary shaft hole 14 of the fixed cutter base 11. The driven arm 20 is drivingly connected to the operating arm 30. The driven arm 20 and the operating arm 30 respectively rotate by using different centers of rotation, so that the total length of the driven arm 20 and the operating arm 30 can generate an increased output torque. Thus, the pulling force necessary for operating the present invention is reduced, which means the present invention is easier to use.

II. The driven arm 20 is stably engaged with the operating arm 30 by means of the engagement between the driven rack 24 and the operating rack 36. As a result, the shearing action of the present invention generated by the driven arm 20 and the operating arm 30 is smoother.

III. The driven arm 20 and the operating arm 30 are pivotally connected to the fixed cutter base 11. The driven arm 20 and the operating arm 30 are sandwiched between the connecting piece 40 and the fixed cutter base 11, so that the driven arm 20 and the operating arm 30 can be restricted to pivotal siding movements only. Further, the relative distance between the fixed rotation hole 21 and the pivotal hole 31 is fixed, thereby preventing change in the relative position between the driven arm 20 and the operating arm 30 as well as the engagement between the driven rack 24 and the operating rack 36.

According to the above, the extended reach garden shears of the present invention really demonstrate industrial applicability, novelty and inventive steps, and thus the present invention conforms to the requirements for an invention patent.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An extended reach garden shears, including:
a shear rod having a fixed cutter base on an end, the fixed cutter base being formed with a hooked cutting edge, the fixed cutter base being provided with a primary shaft hole, a secondary shaft hole and a locking hole;
a driven arm provided with a rotation hole pivotally connected to the primary shaft hole of the fixed cutter base, the driven arm being formed with a cutting blade corresponding to the hooked cutting edge, a bottom end of the cutting blade extending to form a connecting portion, a distal end of the connecting portion being L-shaped to form a driven rack, the driven rack having a curved shape with a radius substantially determined by the rotation hole, the cutting blade and the hooked cutting edge approaching each other to generate a shearing action when they are in a shearing position, the cutting blade and the hooked cutting edge being separated from each other when they are in an un-shearing position;
an operating arm having a pivotal hole, a through-hole and a connecting hole triangularly arranged, the pivotal hole being pivotally connected to the secondary shaft hole of the fixed cutter base, an elastic element being connected between the through-hole and the locking hole of the fixed cutter base, a control rope being operatively coupled to the connecting hole, the operating arm having an operating rack between the pivotal hole and the connecting hole, the operating rack having a curved shape with a radius substantially determined by the pivotal hole, the driven rack being directly engaged with the operating rack; and
a connecting piece provided with a primary through-hole and a secondary through-hole, the primary through-hole of the connecting piece, the primary shaft hole and the rotation hole aligned with each other and fixed together by a fastener, the secondary through-hole of the connecting piece, the secondary shaft hole and the pivotal hole aligned with each other and fixed together by another fastener, whereby the driven arm and the operating arm are sandwiched between the connecting piece and the fixed cutter base.

2. The extended reach garden shears according to claim 1, wherein an outer edge of the driven rack has a first tooth, a first extension being defined between the first tooth and the primary shaft hole, an outer edge of the operating rack has a second tooth, a second extension line being defined between the second tooth and the primary shaft hole, a third extension line being defined between the primary shaft hole and the connecting hole, a first included angle defined between the first extension line and the third extension line, and a second included angle being defined between the second extension line and the third extension line.

3. The extended reach garden shears according to claim 2, wherein the first included angle is equal to the second included angle when the hooked cutting edge and the cutting blade are in the un-shearing position, each of the first included angle and the second included angle being in a range from 10 degrees to 20 degrees.

4. The extended reach garden shears according to claim 2, wherein the first included angle is larger than the second included angle when the hooked cutting edge and the cutting blade are in the shearing position, the first included angle being in a range from 20 degrees to 40 degrees, and the second included angle is smaller than 10degrees.

5. The extended reach garden shears according to claim 1, wherein the elastic element is a tension spring, both ends of the elastic element are formed with a respective hook, the two hooks being hooked into the locking hole of the fixed cutter base and the though-hole of the operating arm, respectively, the hooked cutting edge and the cutting blade being located in the un-shearing position when the elastic element retracts.

6. The extended reach garden shears according to claim 1, wherein the connecting hole of the operating arm is provided with a pulley, the control rope wraps around the pulley, the control rope further wrapping around a roller provided on the shear rod, the hooked cutting edge and the cutting blade being located in the shearing position when the control rope is pulled.

7. The extended reach garden shears according to claim 1, wherein the fixed cutter base is provided with a restricting block, the restricting block abutting against a back of the cutting blade of the driven arm when in the un-shearing position to thereby generate a maximum included angle between the hooked cutting edge and the cutting blade, the restricting block abutting against the connecting portion of the driven arm when in the shearing position to thereby generate a minimum included angle between the hooked cutting edge and the cutter blade.

* * * * *